US008844799B2

(12) United States Patent
Robertson

(10) Patent No.: US 8,844,799 B2
(45) Date of Patent: Sep. 30, 2014

(54) CUP INSULATING INSERT AND METHOD

(75) Inventor: Ronald Robertson, Kansas City, MO (US)

(73) Assignee: Huhtamaki, Inc., De Soto, KS (US)

( * ) Notice: Subject to any disclaimer, the term of this patent is extended or adjusted under 35 U.S.C. 154(b) by 346 days.

(21) Appl. No.: 12/432,513

(22) Filed: Apr. 29, 2009

(65) Prior Publication Data

US 2010/0276480 A1　Nov. 4, 2010

(51) Int. Cl.
| | |
|---|---|
| *B65D 3/00* | (2006.01) |
| *B65D 81/38* | (2006.01) |
| *B31B 1/14* | (2006.01) |
| *B31B 1/62* | (2006.01) |
| *B31B 7/00* | (2006.01) |
| *B31B 15/00* | (2006.01) |

(52) U.S. Cl.
CPC ....... *B65D 81/3886* (2013.01); *B31B 2217/003* (2013.01); *B31B 2217/0076* (2013.01); *B31B 7/00* (2013.01); *B31B 2217/062* (2013.01); *B31B 15/00* (2013.01)
USPC ........... 229/403; 220/592.2; 493/56; 493/150

(58) Field of Classification Search
CPC .. B65D 3/22; B65D 81/3869; B65D 81/3876; B65D 81/3865; B65D 3/06
USPC .......... 229/403, 933, 935, 936, 919; 206/587, 206/588, 589, 590
See application file for complete search history.

(56) References Cited

U.S. PATENT DOCUMENTS

| | | | | |
|---|---|---|---|---|
| 906,818 | A | * | 12/1908 | Peltason .......................... 229/90 |
| 2,762,550 | A | * | 9/1956 | Goettsch et al. .......... 229/122.33 |
| 5,547,124 | A | * | 8/1996 | Mueller ......................... 229/403 |
| 7,458,504 | B2 | | 12/2008 | Robertson et al. |
| 2001/0013537 | A1 | * | 8/2001 | Sadlier ............................ 229/4.5 |
| 2005/0236468 | A1 | * | 10/2005 | Sadlier ............................ 229/403 |
| 2006/0144915 | A1 | * | 7/2006 | Sadlier ............................ 229/403 |
| 2008/0023538 | A1 | | 1/2008 | Robertson et al. |
| 2008/0087677 | A1 | | 4/2008 | Robertson et al. |
| 2008/0087716 | A1 | * | 4/2008 | Sadlier ............................ 229/403 |
| 2010/0276480 | A1 | * | 11/2010 | Robertson ..................... 229/403 |

FOREIGN PATENT DOCUMENTS

JP　　　　2000142834　A　*　1/2000

* cited by examiner

*Primary Examiner* — Gary Elkins
*Assistant Examiner* — Christopher Demeree
(74) *Attorney, Agent, or Firm* — Husch Blackwell LLP

(57) ABSTRACT

An cup insulating insert is provided that is adapted for placement between a container and an outer base sheet. The insert includes a plurality of spaced-apart fingers for separating the container from the base sheet and creating an air gap therebetween. The insert has void spaces or air gaps between the fingers that are sized such that, when a plurality of inserts are formed from a single sheet, the fingers of one insert are formed from the void spaces of an adjacent insert. Multiple inserts can be formed from a single sheet of recyclable material with substantially no waste material being created.

25 Claims, 3 Drawing Sheets

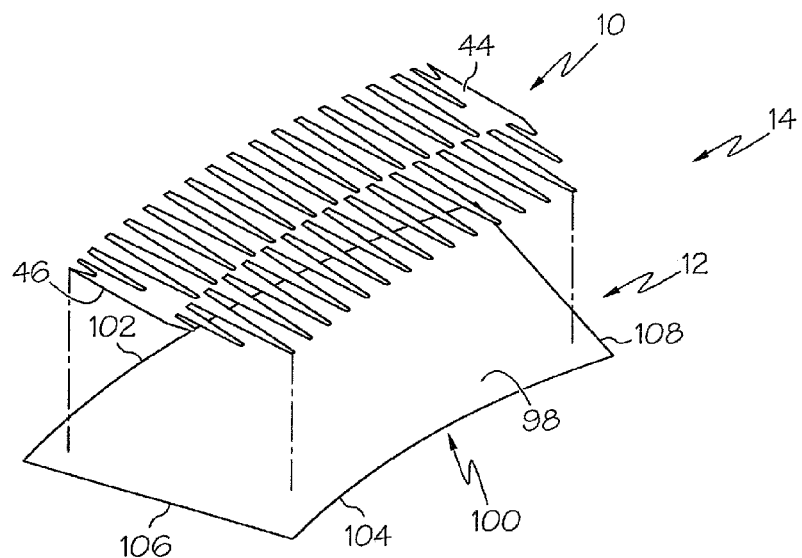
FIG. 3
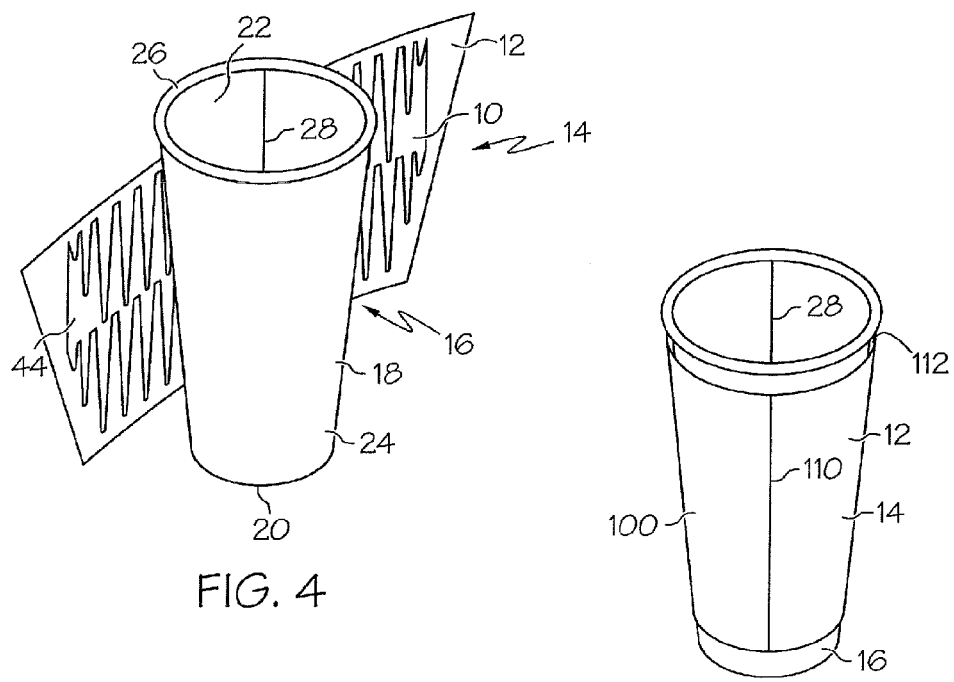
FIG. 4
FIG. 5

CUP INSULATING INSERT AND METHOD

CROSS-REFERENCE TO RELATED APPLICATIONS

None.

BACKGROUND OF THE INVENTION

Commonly known disposable food and drink containers, such as coffee cups, are primarily made from polystyrene foam or paperboard materials. Containers made of polystyrene foam have desirable thermal insulation properties, but are environmentally unfriendly because they are not biodegradable or easily recyclable. Containers made of paperboard materials are environmentally friendly, but have poor thermal insulation properties.

In order to overcome the poor thermal insulation properties normally associated with paperboard containers, it is well known to incorporate a wrapper or sleeve with the paperboard container. Such wrappers often provide insulating material between the container sidewall and the outer wrapper sidewall. In doing so, the wrappers may include an insert layer. However, the wrapper and insert layer add additional material and cost to the container, as well as material that may not be biodegradable or recyclable.

Accordingly, a need exists for an insert layer and wrapper that can be produced from a minimal amount of material. A need further exists for an insert layer than can be produced without creating any substantial amount of waste material. Additionally, a need exists for an insert layer and wrapper that are made from biodegradable and recyclable materials.

SUMMARY OF THE INVENTION

One embodiment of the present invention is directed to a insulating insert adapted for placement between a container and an outer base sheet layer. The insert includes a plurality of spaced-apart fingers for separating the container from the base sheet layer and creating an air gap therebetween. The insert has void spaces or air gaps between the fingers that are sized such that, when a plurality of inserts are formed from a single sheet, the fingers of one insert are formed from the void spaces of an adjacent insert. Multiple inserts can be formed from a single sheet of recyclable material with substantially no waste material being created.

Another embodiment of the present invention is directed to a thermally insulted cup wrapper adapted for placement around a cup that includes an insert adhered to an outer base sheet. The insert has a plurality of fingers with void spaces or air gaps therebetween. The fingers and void spaces are sized such that, when a plurality of inserts are cut from a single sheet, the fingers of one insert are cut from the void spaces of an adjacent insert, thereby creating very little waste. The void spaces form an air gap between the cup and base sheet providing for thermal insulation.

A further embodiment of the present invention is directed to a method of forming a thermally insulted cup wrapper having an outer base sheet layer and an insulating insert that includes the steps of providing a sheet of material, cutting the sheet into a plurality of inserts, wherein a portion of each of the inserts is left uncut, thereby forming a web of inserts, indexing the sheet over a base sheet layer such that one of the inserts is positioned directly above the base sheet, applying adhesive to either the base sheet or the insert, lancing the uncut portion of the insert positioned directly above the base sheet to detach the insert from the web, and affixing the lanced insert to the base sheet by placing the lanced insert onto the base such that the adhesive secures them together.

Certain embodiments of the invention are outlined above in order that the detailed description thereof may be better understood, and in order that the present contributions to the art may be better appreciated. In this respect, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

DESCRIPTION OF THE SEVERAL VIEWS OF THE DRAWINGS

Further features of the present invention will become apparent to those skilled in the art to which the present invention relates from reading the following description with reference to the accompanying drawing figures, in which:

FIG. 3 is an exploded rear perspective view of a cup wrapper sleeve having an insert and outer base sheet in accordance with one embodiment of the present invention;

FIG. 4 is a rear perspective view of a wrapper sleeve being wrapped around a cup in accordance with one embodiment of the present invention; and FIG. 5 is a rear perspective view of a wrapped cup in accordance with one embodiment of the present invention.

DETAILED DESCRIPTION OF THE INVENTION

Figure 1:
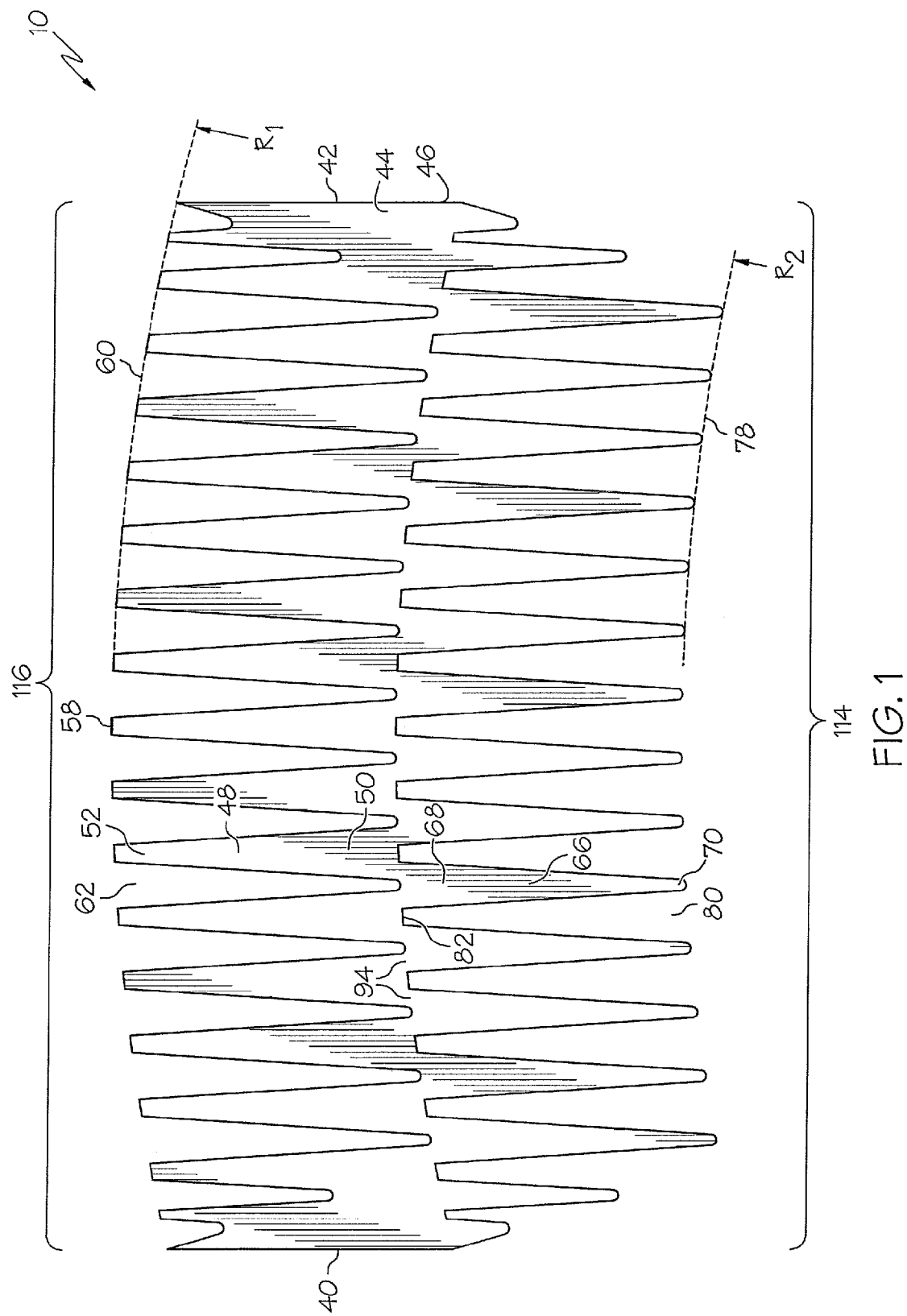
FIG. 1 is a plan view of an insert in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

One embodiment of the present invention is directed to an insulating insert 10 that is used in conjunction with an outer base sheet or sleeve 12 to form a wrapper sleeve 14. The resulting wrapper sleeve 14 can be applied to a storage container 16, such as a cup, to provide the container 16 with improved thermal insulation properties. The insert 10 separates the base sheet 12 from the container sidewall 18 thereby creating a gap 112 between the base sheet 12 and container sidewall 18. The air gap 112 acts as part of an insulating layer to shield a user's hands from the hot or cold contents within the container 16.

Turning to FIG. 1, the insert 10 has a plurality of fingers 48 and 66 with void spaces or air gaps 62 and 80 therebetween. As shown, the insert has upper fingers 48 and lower fingers 66 with upper void spaces or air gaps 62 and lower void spaces or air gaps 80 respectively therebetween. The upper fingers 48 have first ends 50 extending upwardly from the insert's center portion 94 and terminating at distal second ends 52. Likewise, the lower fingers 66 have first ends 68 extending downwardly from the insert's center portion 94 and terminating at distal second ends 70.

While the Figures show an insert having vertically-oriented upper and lower fingers 48 and 66, it will be appreciated by one skilled in the art that the fingers and resulting void spaces may be oriented in other configurations. For example, the insert may only have a single set of fingers or may have fingers that are arranged in a horizontal or angled orientation, so long as the resulting void spaces create a gap 112 between the container sidewall 18 and the base sheet 12.

The insert 10 is configured in a manner such that multiple inserts 10 may be cut from a single sheet 30 or roll (not shown) of material without creating any real amount of waste material. In one preferred embodiment, the cut that forms the trailing (or top) repetitive edge pattern 116 of an insert 10a, thereby separating it from an adjacent insert 10b, also forms the leading (or bottom) repetitive edge pattern 114 of the adjacent insert 10b. Thus, there is no waste material present between any two adjacent inserts 10a and 10b.

As illustrated in FIG. 1, the insert 10 has wave or reciprocating edge patterns forming its edges 114 and 116 that define the fingers 48 and 66 and void spaces 62 and 80. As demonstrated in FIG. 2, the lower fingers 66 of an insert 10b are cut from the upper void spaces 62 of a first adjacent insert 10a, while the upper fingers 48 of the insert 10b are cut from the lower void spaces 80 of a second adjacent insert 10c. Thus, the lower fingers 66 have the same general shape as the upper void spaces 62 and the upper fingers 48 have the same general shape as the lower void spaces 80.

The insert 10 may be configured to conform around a frustoconical container 16, such a drinking cup like the one shown in FIGS. 4 and 5. To facilitate its ability to conform around a frustoconical container 16, the insert 10 has a slightly arcuate shape. As illustrated in FIG. 1, the upper finger second ends 52 form an arc 60 having a radius $R_1$. Similarly, the lower fingers second ends 70 form an arc 78 having a radius $R_2$. Because the inserts leading edges 114 and trailing edges 116 are identically shaped, radius $R_1$ is equal to radius $R_2$. The spaces 62 and 80 between the fingers 48 and 66, as well as the minimal amount of material in the center portion 94, help the insert 10 to have flexibility along its longitudinal axis and conform to a container 16.

As mentioned above, one of the functions of the insert 10 is to create separation between the base sheet 12 and the container sidewall 18 so that a gap 112 is formed therebetween. The fingers 48 and 66 are spaced apart so that they provide an adequate amount of open area between the base sheet 12 and the container sidewall 18, but yet are close enough together to provide sufficient support to prevent the base sheet 12 from collapsing onto the container sidewall 18 when a user is gripping the base sheet 12. The preferable distance between the finger's centers is from about ¼ to 1 inch, and more preferably from about ½ to ¾ inch. However, it will be understood that, depending upon the application, the fingers may be spaced closer or farther apart.

As shown, the insert 10 is constructed from a single piece of material. As mentioned above, the insert 10 may be cut from a sheet 30 or roll (not shown) of material. The insert 10 may be constructed from a variety of types of materials, including but not limited to recycled material, paperboard material, foam material, potato starch material and plastic material. In one preferred embodiment, the material forming the insert 10 is biodegradable and recyclable.

The thickness of the insert 10 may vary from embodiment to embodiment. The preferable thickness of the insert 10 is from about 5 to 30 mils, and more preferably from about 10 to 20 mils. However, it will be understood that, depending upon the application, the insert 10 may be of other thicknesses. In order to create a larger air gap 112, the material may be corrugated, have dimpled surfaces, or may be embossed.

Turning now to the method of making and using the insert 10, as mentioned above, a plurality of inserts 10 may be formed from a single sheet 30 or roll (not shown) of material. While the method will be described in relation to a sheet 30, it is understood that when a roll is used, the process of forming and using the inserts 10 is substantially similar to that which is employed when using a sheet 30, except for that with a roll, the method becomes a continuous process.

Figure 2:
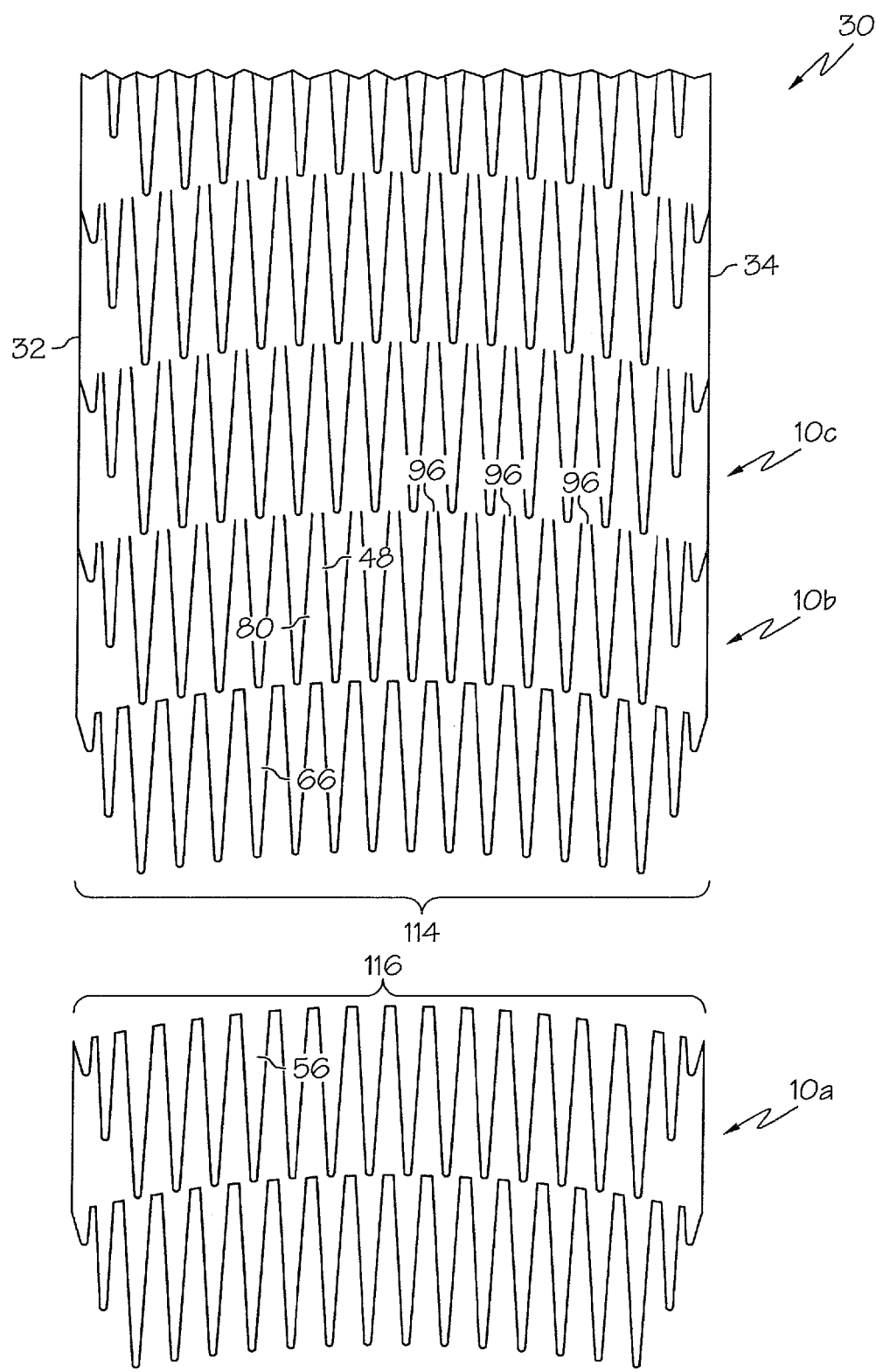
FIG. 2 is a sectional plan view of a web comprised of a plurality of partially-cut inserts and one insert detached therefrom in accordance with one embodiment of the present invention.

As shown in FIG. 2, the sheet 30 has a width equal to that of the inserts 10 so that the side edges 32 and 34 of the sheet 30 form the side edges 40 and 42 of the inserts 10, thereby leading to no waste material being formed on either side of the inserts 10. Therefore, since no waste material is formed between adjacent inserts 10a, 10b and 10c and no waste material is formed proximate the side edges 40 and 42 of the inserts, the only place waste can occur is at the very beginning and ending edges (not shown) of each sheet or roll of material. Because thousands of inserts 10 can be formed from a single roll of material, that waste is extremely insignificant.

In the method, the sheet 30 of material is first indexed through a cutting machine, such as a reciprocating or rotating die cutter, where the sheet 30 is cut into a plurality of inserts 10. The sheet 30 may also be cut using a rule die. A few small portions 96 of the inserts 10 are left uncut, thereby forming a web of inserts 10 like the one shown in FIG. 2. As illustrated, the uncut portions 96 of the inserts 10 are proximate the upper finger top edges 58 (or lower void space top edges 82).

After being cut into a web of inserts 10, the sheet 30 is indexed over a base sheet 12 such that one of the inserts 30 is positioned directly above the base sheet 12. As shown in FIG. 3, the base sheet 12 includes a top edge 102, a bottom edge 104, a first side edge 106, a second side edge 108, an inner surface 98 and an outer surface 100. The base sheet 12 is preferably formed from a sidewall blank which is die-cut from a larger sheet or roll of paper or other suitable sheet material such as paperboard, cardboard or a thermoplastic material.

An adhesive can then be applied to either the insert outer surface 46 or the base sheet inner surface 98. The adhesive can be an adhesive capable of providing a paper-to-paper or paper-to-plastic bond, depending upon the nature of the materials used to form the insert 10 and the base sheet 12. Exemplary adhesives that can be used include pressure sensitive adhesives, hot melt adhesives, contact adhesives and drying adhesives.

Though the method of attachment as described herein uses adhesive, in the case when the insert 10 is to be combined with base sheet 12 and directly wrapped around the base container 16 in an subsequent operation on the forming machine, it is possible to utilize a clamping system (not shown) to temporarily clamp the insert 10 to the sheet 12 so as to transport them together to the wrapping station.

The primary function of the adhesive between insert 10 and sheet 12 is to hold the two together during transportation to the wrapping station. It is not necessary to adhesively seal the insert 10 to the sleeve 12 to keep it positioned between the container 16 and the sleeve 12, because once the liner 10 is encapsulated between the sleeve 12 and base container 16 it cannot easily fall out due to friction of the materials. Alternatively, the insert 12 can be sealed to the container 16, if needed, in the same method as the sleeve 12 is sealed to the cup.

The clamp system would eliminate the adhesive, as the clamping system would pinch the sleeve 12 and insert 10 together long enough to transport the pair to the wrapping section. Once at the wrapping station, the clamps are removed and the sleeve 12 and insert 10 are wrapped around the container 16 and the sleeve 12 is attached to the container 16 by typical sealing methods. It will be appreciated that implementing this enhancement on currently existing machines will simplify the process and eliminate the inefficiency and cost of the adhesive.

The next step involves cutting or lancing the uncut portion 96 of the insert 10 that is positioned directly above the base sheet 12 in order to detach the insert 10 from the web. As the insert 10 is cut from the web, it is pushed downward onto the base sheet 12 so that the adhesive secures them together to form a wrapper sleeve 14.

At this point the newly formed wrapper sleeve 14 can either be applied directly to a container 16 or may be prepared for use in the future. As shown in FIGS. 4 and 5, the wrapper sleeve 14 may be applied to a paperboard container 16 such as a drinking cup commonly used to serve hot beverages such as coffee, hot chocolate or tea. The container 16 shown in the drawing includes a sidewall 18 having opposing first and second ends 36 and 38 and a circular bottom portion 20 adjacent the second end 38 that may be composed of a wall (not shown) for closing the second end 38. The sidewall 18 has inner and outer surfaces 22 and 24 and, together with the bottom portion 20, defines a storage chamber 54. The sidewall 18 extends upwardly from the circular bottom portion 20 and terminates in a rolled upper lip 26 forming an open mouth. The sidewall 18 may also include a seam 28.

In one embodiment, upon its formation, the wrapper sleeve 14 is indexed under the container 16 and wrapped around the container sidewall 18 so that the insert's inner surface 44 comes into contact with the container sidewall's outer surface 24. The wrapper sleeve 14 may be secured to the container 16 with an adhesive or through the use of a commonly known sealing technology. As shown in FIG. 5, the base sheet first and second side edges 106 and 108 come together to form a seam 110. The seam 110 may be a butt seam or an overlap seam. As shown in FIG. 5, the wrapper seam 110 can be placed opposite the container sidewall seam 28.

Alternatively, wrapper sleeve 14 may be prepared so that it can be used in the future. For example, the wrapper sleeve 14 may be formed into a frustoconical configuration so that it may later be applied to a container 16 like the one shown in FIGS. 4 and 5. Formed wrapper sleeves 14 can be stacked similar to how frustoconical cups are stacked for storage and transportation. Alternatively, wrapper sleeve 14 may be formed and folded flat so that it can be packaged for storage and transportation without requiring a substantial amount of space.

From the foregoing, it may be seen that the insulating insert of the present invention is particularly well suited for the proposed usages thereof. Furthermore, since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

I claim:

1. An insulating insert adapted for placement between a cup and an outer sleeve, said insert comprising:
    a plurality of spaced-apart upper fingers having upper void spaces therebetween and a plurality of spaced-apart lower fingers having lower void spaces therebetween, said fingers having a thickness for separating said container from said outer sleeve;
    the size and shape of each said upper finger being generally identical to the size and shape of a corresponding said lower void space positioned directly below each said upper finger;
    the size and shape of each said lower finger being generally identical to the size and shape of a corresponding said upper void space positioned directly above each said lower finger;
    wherein said upper fingers and said lower fingers extend from a center portion of said insert; and
    wherein said void spaces form an insulating air gap between said container and said outer sleeve.

2. The insert of claim 1, wherein a plurality of said inserts are formed from a single sheet of material to thereby eliminate substantially all waste material.

3. The insert of claim 1 further comprising top and bottom edges, wherein when a plurality of inserts are formed from a single sheet, the top edge of a first said insert is formed from the bottom edge of a second adjacent said insert.

4. The insert of claim 3, wherein there is substantially no waste material formed between two adjacent inserts.

5. The insert of claim 1, wherein the spacing between said fingers is not greater than approximately ½ inch.

6. The insert of claim 1, wherein said insert is constructed from a single piece of material.

7. The insert of claim 1, wherein said insert is constructed from one of a recycled material, a paperboard material, a foam material, a potato starch material and a plastic material.

8. The insert of claim 1, wherein said insert is configured to conform around a frustoconical container.

9. The insert of claim 8, wherein said frustoconical container is a drinking cup.

10. The insert of claim 1, wherein said fingers lie in a substantially common plane prior to said insert being wrapped around said container.

11. The insert of claim 1, wherein said upper fingers extend upwardly from said center portion of said insert and said lower fingers extend downwardly from said center portion of said insert.

12. The insert of claim 1, wherein said insert is non-corrugated.

13. The insert of claim 1, wherein said insert is non-corrugated, non-dimpled and non-embossed.

14. The insert of claim 1, wherein the geometric shape of each said upper finger being generally identical to the geometric shape of each said corresponding lower void space and wherein the geometric shape of each said lower finger being generally identical to the geometric shape of each said corresponding upper void space.

15. The insert of claim 1, wherein said fingers and void spaces are generally triangular in shape.

16. The insert of claim 1, wherein at least a portion of said upper fingers extend upwardly from said center portion of said insert to upper distal ends and wherein at least a portion of said lower fingers extend downwardly from said center portion of said insert to lower distal ends.

17. The insert of claim 16, wherein at least a portion of said upper fingers each include a lower end proximate said center portion of said insert and wherein at least a portion of said lower fingers each include an upper end proximate said center portion of said insert.

18. The insert of claim 16, wherein at least a portion of said upper fingers extend substantially half the overall height of said insert and wherein at least a portion of said lower fingers extend substantially half the overall height of said insert.

19. The insert of claim 1, wherein said upper fingers and said lower fingers are connected at said center portion of said insert.

20. A thermally insulated cup wrapper sleeve adapted for placement around a cup, said wrapper comprising:
   an outer base sheet having an inner surface and an outer surface;
   an insert having a plurality of spaced-apart upper fingers having upper void spaces therebetween and a plurality of spaced-apart lower fingers having lower void spaces therebetween, the size and shape of each said upper finger being generally identical to the size and shape of a corresponding said lower void space positioned directly below each said upper finger, the size and shape of each said lower finger being generally identical to the size and shape of a corresponding said upper void space positioned directly above each said lower finger;
   wherein said upper fingers and said lower fingers extend from a center portion of said insert;
   wherein said insert is adhered to said base sheet inner surface; and
   wherein said void spaces form an air gap between said cup and base sheet for providing thermal insulation.

21. The cup wrapper of claim 20, the insert further including top and bottom edges, wherein when a plurality of inserts are formed from a single sheet, the top edge of a first said insert is formed from the bottom edge of a second adjacent said insert, such that there is substantially no waste material formed between said first and second adjacent inserts.

22. A multi walled container comprising:
   a sidewall having opposite first and second end portions, said first end portion defining an open mouth, said sidewall having an exterior surface;
   a bottom wall adjacent the second end portion and closing the second end portion, said sidewall and bottom wall defining a storage chamber;
   a wrapper sleeve positioned outwardly of and overlying at least a portion of the sidewall exterior surface and secured thereto;
   wherein said wrapper sleeve comprises a plurality of layers including an outer base sheet and an insert;
   wherein said insert has a plurality of spaced-apart upper fingers having upper void spaces therebetween and a plurality of spaced-apart lower fingers having lower void spaces therebetween, the size and shape of each said upper finger being generally identical to the size and shape of a corresponding said lower void space positioned directly below each said upper finger, the size and shape of each said lower finger being generally identical to the size and shape of a corresponding said upper void space positioned directly above each said lower finger;
   wherein said upper fingers and said lower fins ers extend from a center portion of said insert; and
   wherein said void spaces providing an insulating air space between said sidewall and outer base sheet.

23. A web of insulating inserts adapted for placement between a cup and an outer sleeve, said web comprising:
   an insert, a first adjacent insert and a second adjacent insert, wherein said insert, said first adjacent insert and said second adjacent insert each include a plurality of spaced-apart upper fingers extending upwardly from a respective center portion and having upper void spaces therebetween and a plurality of spaced-apart lower fingers extending downwardly from said respective center portion and having lower void spaces therebetween, said fingers having a thickness for separating said container from said outer sleeve; and
   wherein said fingers and void spaces being sized and configured such that when said insert, said first adjacent insert and said second adjacent insert are formed from a single sheet, the upper fingers of said second insert are formed from the lower void spaces of said first adjacent insert and the lower fingers of said insert are formed from the upper void spaces of said second adjacent insert.

24. The web of claim 23, wherein the size and shape of each said finger being generally identical to the size and shape of a corresponding said void space such that substantially no waste material is formed between said insert, said first adjacent insert and said second adjacent insert.

25. The web of claim 23, wherein said insert, said first adjacent insert and said second adjacent insert each comprise a leading edge and a trailing edge, wherein a cut forming the leading edge of said insert also forms the trailing edge of said second adjacent insert and wherein a cut forming the trailing edge of said insert also forms the leading edge of said first adjacent insert.

* * * * *